United States Patent
Burra et al.

(10) Patent No.: US 11,451,057 B2
(45) Date of Patent: Sep. 20, 2022

(54) SYSTEMS AND METHODS FOR CONTROLLING ELECTRICAL POWER SYSTEMS CONNECTED TO A POWER GRID

(71) Applicants: General Electric Company, Schenectady, NY (US); Rajni Kant Burra, Clifton Park, NY (US); Govardhan Ganireddy, Roanoke, VA (US); Anthony Michael Klodowski, Hardy, VA (US); Wenqiang Yang, Shanghai (CN)

(72) Inventors: Rajni Kant Burra, Clifton Park, NY (US); Govardhan Ganireddy, Roanoke, VA (US); Anthony Michael Klodowski, Hardy, VA (US); Wenqiang Yang, Shanghai (CN)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 16/647,213

(22) PCT Filed: Sep. 15, 2017

(86) PCT No.: PCT/CN2017/101882
§ 371 (c)(1),
(2) Date: Mar. 13, 2020

(87) PCT Pub. No.: WO2019/051771
PCT Pub. Date: Mar. 21, 2019

(65) Prior Publication Data
US 2020/0235577 A1 Jul. 23, 2020

(51) Int. Cl.
*H02J 3/16* (2006.01)
*H02J 3/38* (2006.01)

(52) U.S. Cl.
CPC ............. *H02J 3/16* (2013.01); *H02J 3/381* (2013.01); *H02J 2300/28* (2020.01)

(58) Field of Classification Search
CPC .......... H02J 3/16; H02J 3/381; H02J 2300/28
See application file for complete search history.

(56) References Cited

U.S. PATENT DOCUMENTS

| | | | |
|---|---|---|---|
| 8,669,669 B1 | 3/2014 | Wagoner et al. | |
| 2010/0025994 A1* | 2/2010 | Cardinal | H02J 3/381 |
| | | | 290/44 |

(Continued)

FOREIGN PATENT DOCUMENTS

| | | |
|---|---|---|
| CN | 104201711 A | 12/2014 |
| CN | 104734189 A | 6/2015 |

(Continued)

OTHER PUBLICATIONS

PCT International Search Report Corresponding to PCT/CN2017/101882 dated Jun. 13, 2018.

(Continued)

*Primary Examiner* — Harry R Behm
(74) *Attorney, Agent, or Firm* — Dority & Manning, P.A.

(57) ABSTRACT

A method for controlling an electrical power system connected to a power grid includes receiving a reactive power command and a measured reactive power and generating a reactive power error signal based on a difference between the reactive power command and the measured reactive power. Further, the method includes receiving, via a reactive power regulator, the reactive power error signal. Moreover, the method includes generating, via the reactive power regulator, a voltage command based on the error signal. The method also includes generating, via a droop control, a voltage droop signal. In addition, the method includes generating a voltage error signal as a function of the voltage droop signal and at least one of the voltage command or a (Continued)

measured terminal voltage. Thus, the method further includes generating, via a voltage regulator, a reactive current command based on the voltage error signal.

17 Claims, 9 Drawing Sheets

(56) References Cited

U.S. PATENT DOCUMENTS

| | | | |
|---|---|---|---|
| 2012/0136494 A1 | 5/2012 | Kirchner et al. | |
| 2014/0062085 A1 | 3/2014 | Larsen et al. | |
| 2015/0061290 A1* | 3/2015 | Larsen | F03D 9/257 290/44 |
| 2015/0337808 A1 | 11/2015 | Kang et al. | |
| 2016/0333856 A1* | 11/2016 | Zabalza | G05F 5/00 |

FOREIGN PATENT DOCUMENTS

| | | |
|---|---|---|
| CN | 106655205 A | 5/2017 |
| EP | 2846434 A1 | 3/2015 |
| WO | WO 2014/056504 A2 | 4/2014 |

OTHER PUBLICATIONS

European Search Report, dated Dec. 14, 2020, for EP Application No. 17924873.7.

* cited by examiner

SYSTEMS AND METHODS FOR CONTROLLING ELECTRICAL POWER SYSTEMS CONNECTED TO A POWER GRID

FIELD

The present disclosure relates generally to wind turbines, and more particularly, to systems and methods for providing voltage stability for a plurality of wind turbines connected to a power grid.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Figure 1:
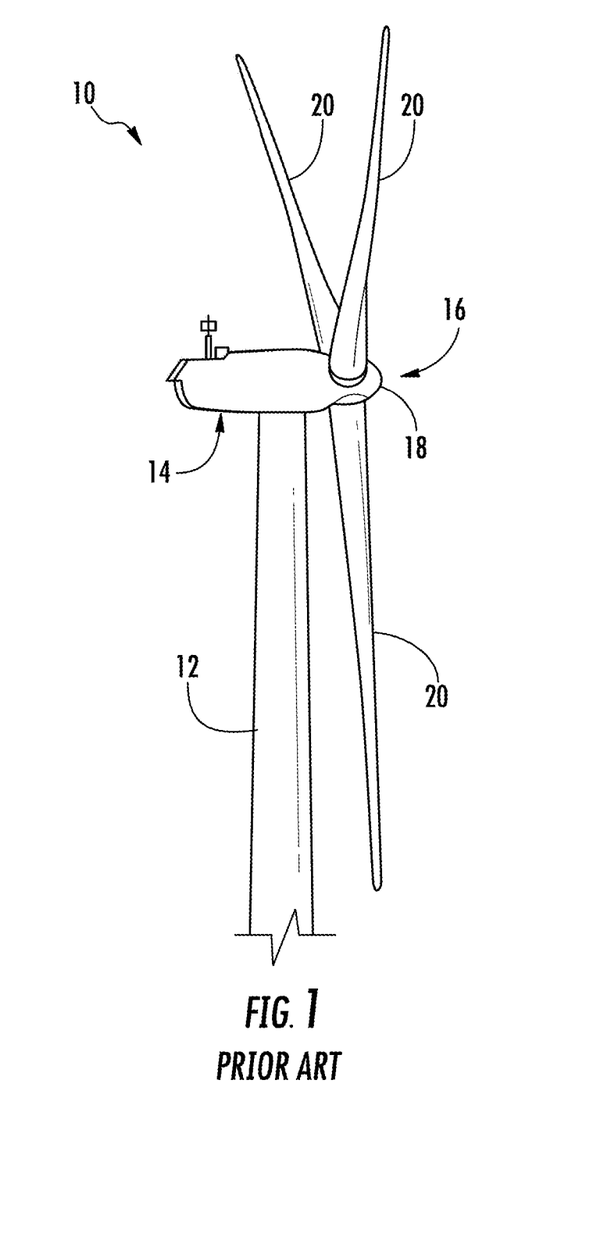
FIG. 1 illustrates a perspective view of a portion of one embodiment of a wind turbine according to conventional construction.
Figure 2:
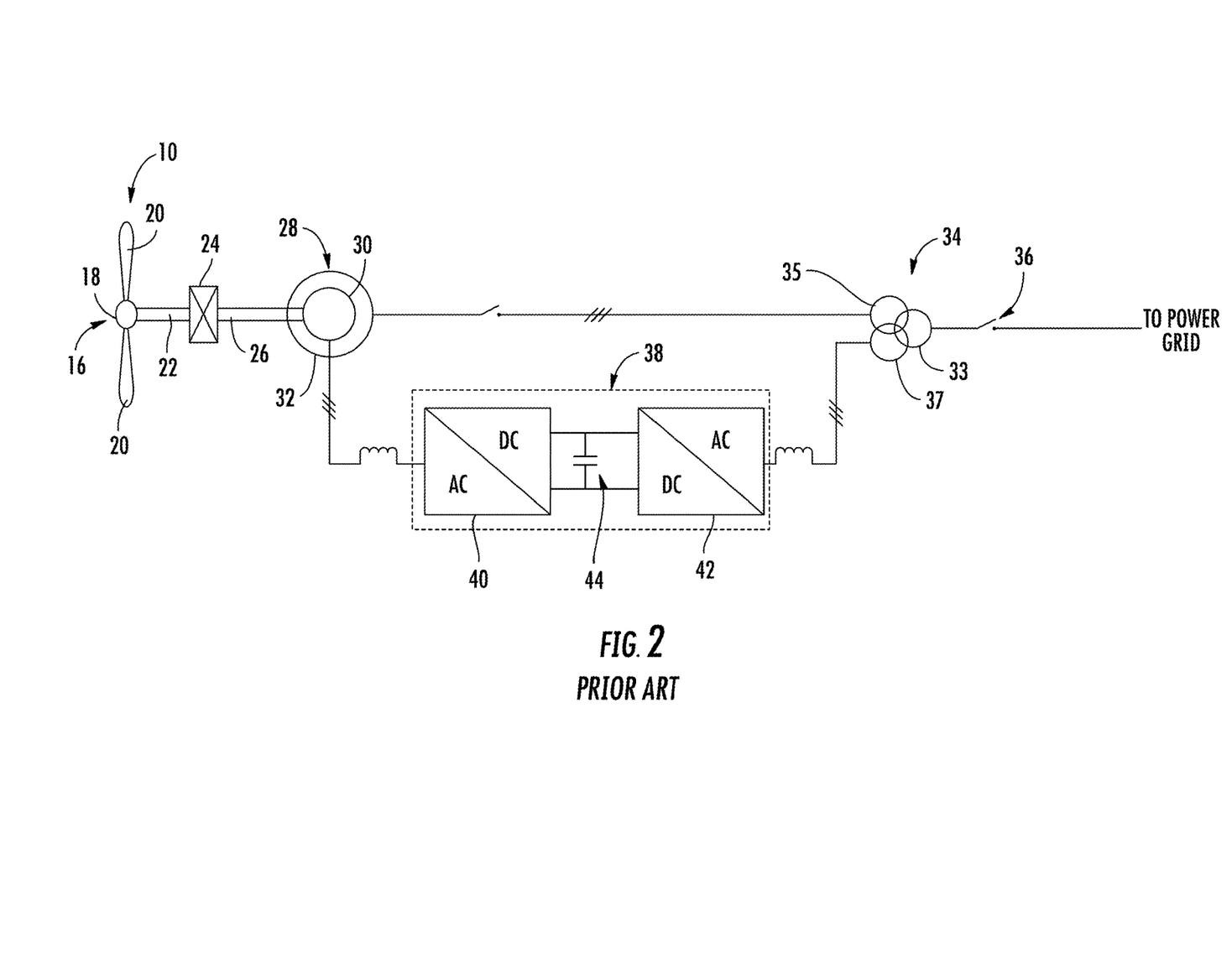
FIG. 2 illustrates a schematic diagram of a conventional electrical power system suitable for use with the wind turbine shown in FIG. 1.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

The illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Figure 3:
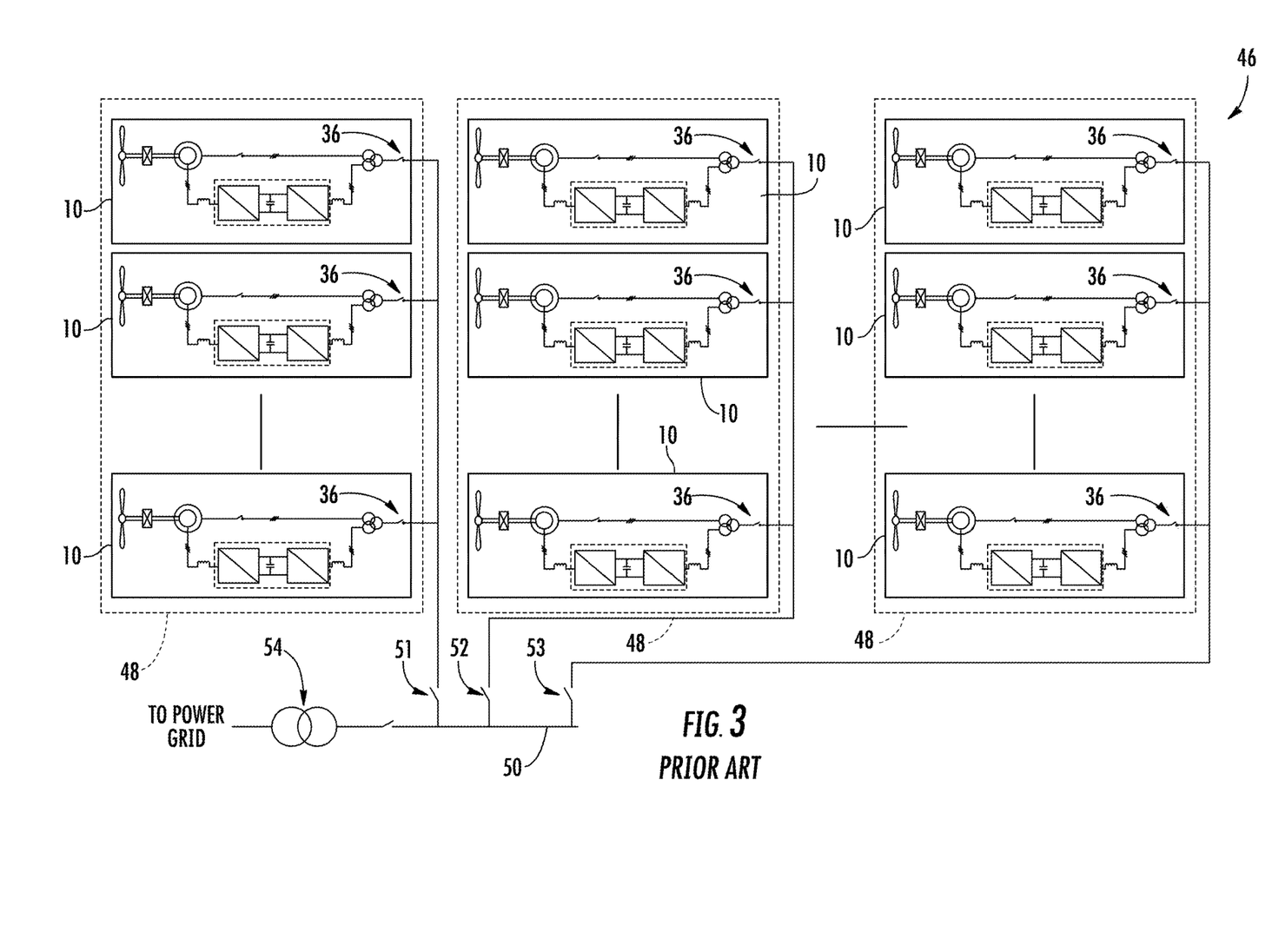
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

With the growing success of wind power production in recent years, this form of power has gained significant market share. As wind power is not a power source having a constant power output, but includes variations, for example due to variations of the wind speed, operators of power distribution networks have to take this into account. One of the consequences is, for example, that the distribution and transmission networks have become more difficult to manage. This pertains also to the management of the amount of reactive power flow in a network.

Figure 4:
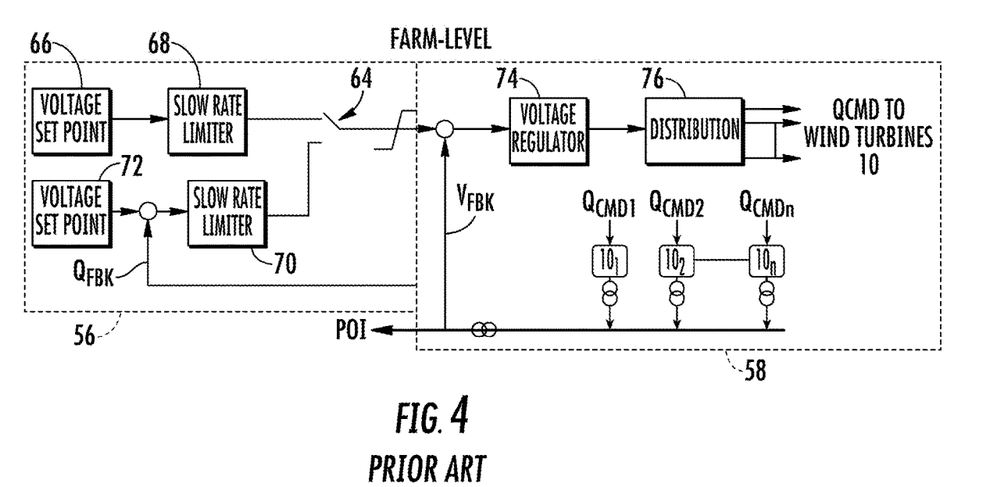
FIG. 4 illustrates a schematic diagram of one embodiment of a farm-level control scheme according to conventional construction.
Figure 5:
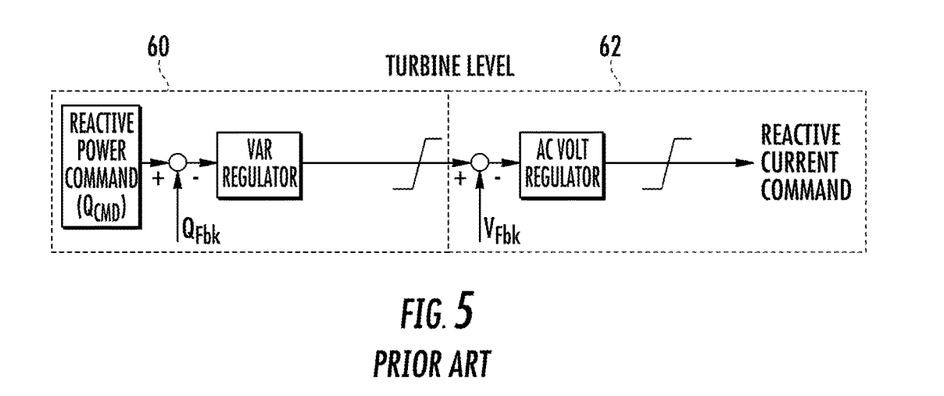
FIG. 5 illustrates a schematic diagram of one embodiment of a turbine-level control scheme according to conventional construction.

Referring now to FIGS. 4 and 5, schematic diagrams of a farm-level reactive power control scheme and a turbine-level reactive power control scheme are illustrated, respectively, according to conventional construction. More specifically, as shown in FIG. 4, the farm-level control scheme includes a fast inner voltage magnitude loop 58 and a slow outer reactive power loop 56. Further, as shown, the farm-level controller alternates between voltage control and reactive power controller via switch 64. For voltage control, the farm-level controller receives a voltage set point 66 and limits the set point via a slew rate limiter 68. For reactive power control, the farm-level controller regulates the reactive power via a VAR regulator 70 based on a reactive power set point 72 and a reactive power feedback signal $Q_{FBK}$. The farm-level controller then limits either the voltage or reactive power signal that enters the fast inner voltage magnitude loop 58. As shown at 74, another voltage regulator 74 regulates the voltage signal to determine a reactive power command for the wind farm. The farm-level controller then distributes the net reactive power command ($Q_{CMD}$) to individual wind turbines 102 (i.e. $10_1$, $10_2$, to $10_n$ and so on).

At the turbine level, as shown in FIG. 5, there is another volt/VAR control loop that consists of a faster inner magnitude loop 62 and a slower outer reactive power loop 60. Further, the three-winding transformer 34 of each wind turbine 10 provides a certain impedance that allows the wind turbines 10 in the wind farm 46 to regulate the voltage at the secondary winding of the three-winding transformer. This in turn enables regulating the voltage at the point of common coupling (POCC) or point of interconnection (POI). Thus, the faster inner magnitude loop 62 provides the grid with fast voltage magnitude support for transient events, while the slower outer reactive power loop 60 provides VAR balance between the wind turbines 10 in steady state.

In such systems, however, the three-winding transformers 34 associated with each wind turbine 10 is expensive. Particularly, the secondary winding 35 of the transformer 34 that is connected to the generator stator 32 can be costly. Thus, for some wind turbine power systems, the three-winding transformer is eliminated. In such systems, the output of two or more wind turbines is directly coupled to a medium-voltage (MV) collection system. The collection system then connects the wind turbines to the secondary winding of a cluster transformer that steps up the voltage from a MV level to the POI voltage level. In this configuration, the wind turbines are connected to a common point without any impedance between them. Due to the absence of impedance provided by the stator winding 35 in the three-winding transformers 34, however, the goal of each wind turbine to simply regulate the turbine terminal voltage becomes difficult.

Thus, it would be advantageous to provide a wind farm having a plurality of wind turbines without the three-winding transformer described above, but that maintains the systems' voltage stability and minimizes reactive power oscillations between the wind turbines.

BRIEF DESCRIPTION

Aspects and advantages of the invention will be set forth in part in the following description, or may be obvious from the description, or may be learned through practice of the invention.

In one aspect, the present subject matter is directed to a method for controlling an electrical power system connected to a power grid. The electrical power system has a plurality of clusters of electrical power subsystems. Each of the electrical power subsystems defines a stator power path and a converter power path for providing power to the power grid. The converter power path has a partial power transformer. The method includes receiving, via a controller, a reactive power command and a measured reactive power. The method also includes generating, via the controller, a reactive power error signal based on a difference between the reactive power command and the measured reactive power. Further, the method includes receiving, via a reactive power regulator, the reactive power error signal. Moreover, the method includes generating, via the reactive power regulator, a voltage command based on the error signal. The method also includes generating, via a droop control, a voltage droop signal. In addition, the method includes generating, via the controller, a voltage error signal as a function of the voltage droop signal and at least one of the voltage command or a measured terminal voltage. Thus, the method further includes generating, via a voltage regulator, a reactive current command based on the voltage error signal.

In another aspect, the present disclosure is directed to a control system for an electrical power system connected to a power grid. The electrical power system has a plurality of clusters of electrical power subsystems. Each of the electrical power subsystems defines a stator power path and a converter power path for providing power to the power grid. The converter power path has a partial power transformer. The control system includes one or more sensors for generating at least one of a measured reactive power or a measured terminal voltage, a controller configured to receive a reactive power command and the measured reactive power and generate a reactive power error signal based on a difference between the reactive power command and the measured reactive power, and a reactive power regulator configured to receive the reactive power error signal and generate a voltage command based on the error signal. Further, the control system may include a droop control configured to generate a voltage droop signal. The controller may also be configured to generate a voltage error signal as a function of the voltage droop signal and at least one of the voltage command or a measured terminal voltage. In addition, the control system may include a voltage regulator configured to generate a reactive current command based on the voltage error signal. It should be understood that the control system may further include any of the additional features as described herein.

In yet another aspect, the present disclosure is directed to a wind farm. The wind farm includes a plurality of wind turbine clusters each having a plurality of wind turbines. Each of the wind turbines has a power converter electrically coupled to a generator with a generator rotor and a generator stator. Further, each of the wind turbines defines a stator power path and a converter power path for providing power to the power grid. The converter power path contains a partial power transformer. The wind farm also includes a cluster transformer connecting each cluster of wind turbines to a power grid and a plurality of turbine controllers. Each of the turbine controllers is communicatively coupled to one of the wind turbines. Further, the turbine controllers are configured to perform one or more operations, including but not limited to receiving a reactive power command and a measured reactive power, generating a reactive power error signal based on a difference between the reactive power command and the measured reactive power, receiving the reactive power error signal, generating a voltage command based on the error signal, generating a voltage droop signal, generating a voltage error signal as a function of the voltage droop signal and at least one of the voltage command or a measured terminal voltage, and generating a reactive current command based on the voltage error signal. It should be understood that the wind farm may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for controlling an electrical power system connected to a power grid. The method includes receiving a reactive power command and a measured reactive power and generating a reactive power error signal based on a difference between the reactive power command and the measured reactive power. Further, the method includes generating a voltage command based on the reactive power error signal. The method also includes generating a voltage droop signal via a droop control and generating a voltage error signal as a function of the voltage droop signal and the voltage command and/or a measured terminal voltage. Thus, the method further includes generating a reactive current command based on the voltage error signal. As such, the system and method of the present disclosure provide many advantages not present in the prior art. For example, the present disclosure reduces reactive power oscillations between wind turbines due to low impedances between each of the turbine generators.

Figure 6:
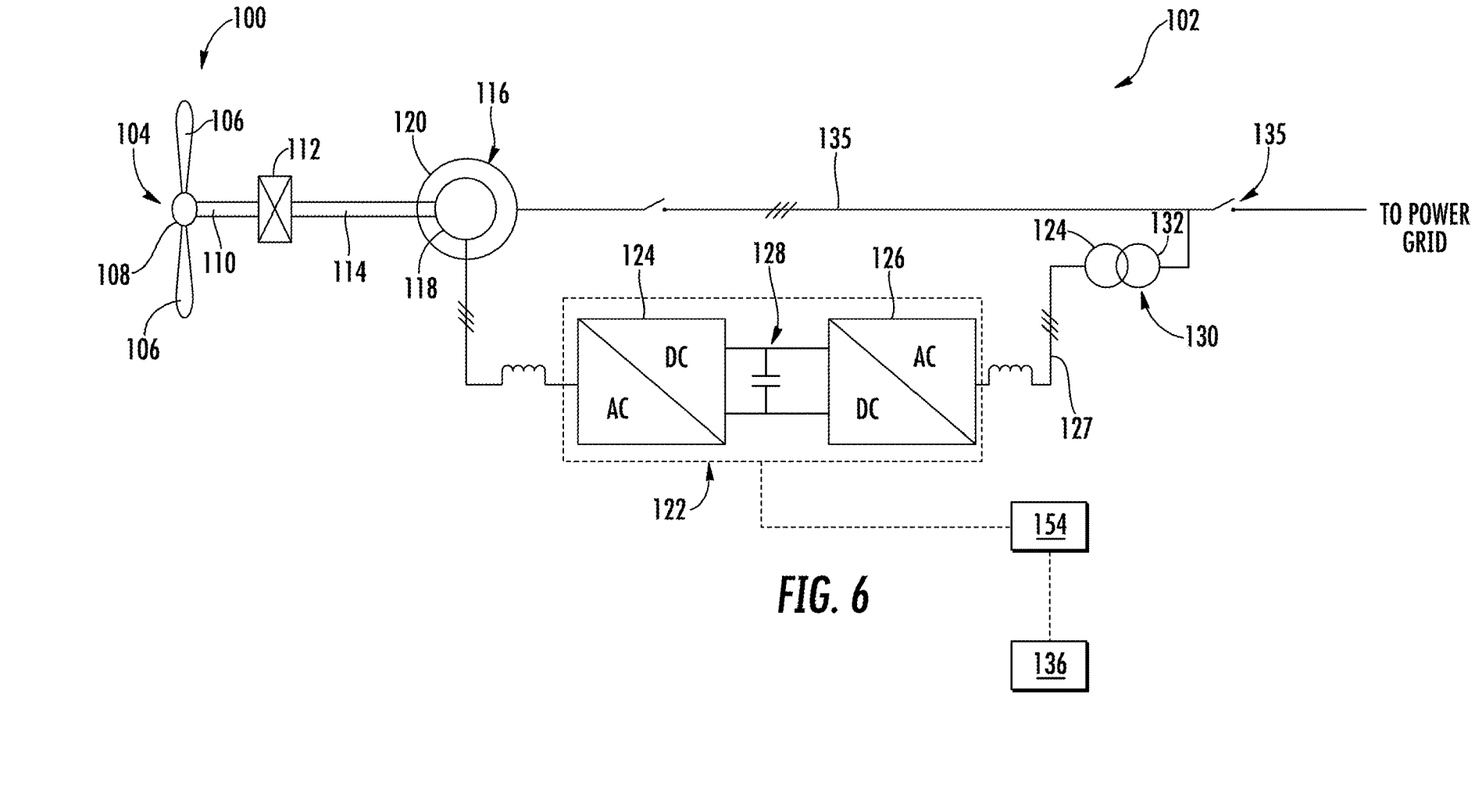
FIG. 6 illustrates a schematic diagram of one embodiment of an electrical power system for a wind turbine according to the present disclosure.

Referring now to FIG. 6, a schematic diagram of one embodiment of an electrical power subsystem 102 according to the present disclosure is illustrated. It should be understood that the term "subsystem" is used herein to distinguish between the individual power systems (e.g. as shown in FIG. 6) and the overall electrical power system 105 of FIG. 7 that includes a plurality of electrical power subsystems 102. Those of ordinary skill in the art, however, will recognize that the electrical power subsystem 102 of FIG. 6 may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 6 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the rotor side converter 124.

Figure 8:
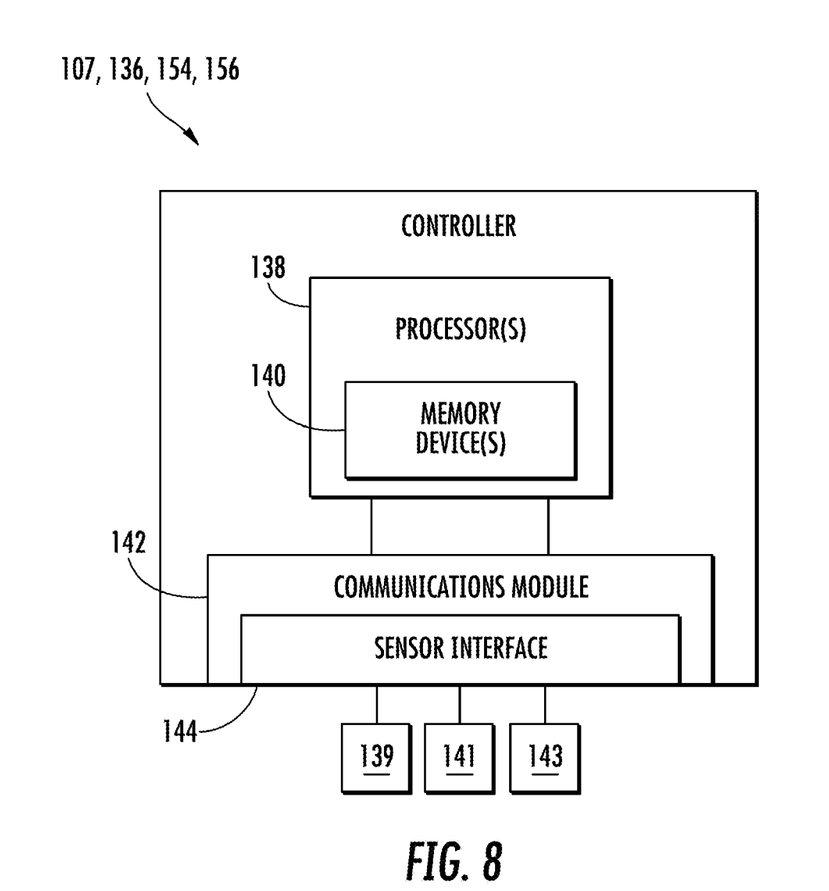
FIG. 8 illustrates a block diagram of one embodiment of a wind turbine controller according to the present disclosure.

In addition, the electrical power system 100 may include one or more controllers. For example, as shown in FIG. 8, the system 100 may include a system-level controller (e.g. a farm-level controller 107), one or more cluster-level controllers 156, and/or one or more subsystem-level controllers (e.g. turbine-level controllers 136). As such, the various controllers described herein are configured to control any of the components of the wind farm 105, the wind turbine clusters 137, and/or the individual wind turbines 100 and/or implement the method steps as described herein.

For example, as shown particularly in FIG. 8, a block diagram of one embodiment of a controller as described herein is illustrated. As shown, the controller may include one or more processor(s) 138 and associated memory device(s) 140 configured to perform a variety of computer-implemented functions (e.g., performing the methods, steps, calculations and the like and storing relevant data as disclosed herein). Additionally, the controller may also include a communications module 142 to facilitate communications between the controller and the various components of the wind farm 105, e.g. any of the components of FIGS. 6 and 7. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 8, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 124. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the bus. It should be understood that the rotor side converter 124 and the line side converter 126 may have any configuration using any switching devices that facilitate operation of electrical power system 200 as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 7:
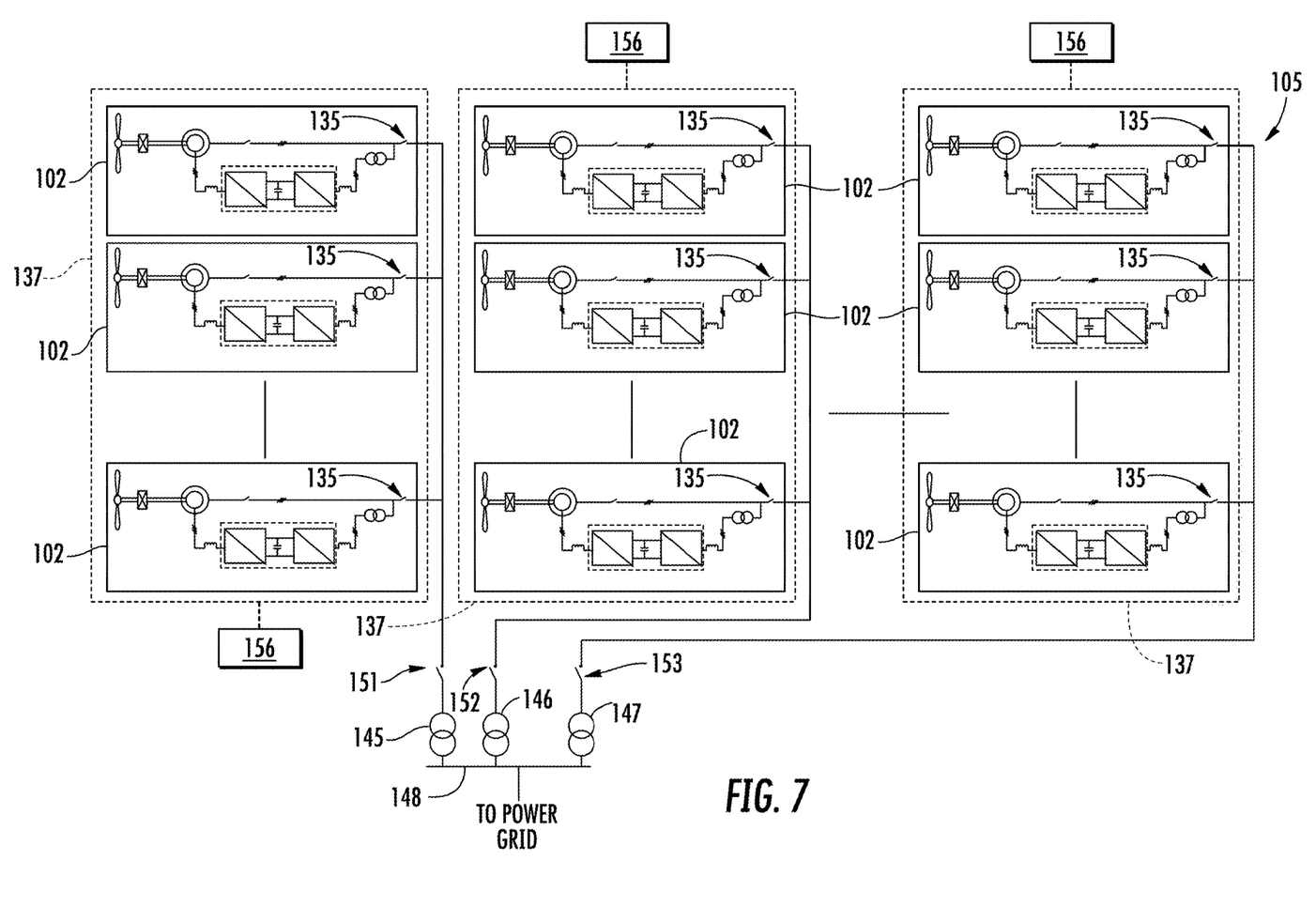
FIG. 7 illustrates a schematic diagram of one embodiment of a wind farm according to the present disclosure, particularly illustrating a plurality of wind turbine clusters each connected to the grid via a cluster transformer.

Referring particularly to FIG. 7, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate transformer 145, 146, 147 via switches 150, 151, 152, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the voltage from each cluster 137 before sending the power to the grid. Further, as mentioned, each of the clusters 137 may be communicatively coupled with a cluster-level controller 156.

Figure 9:
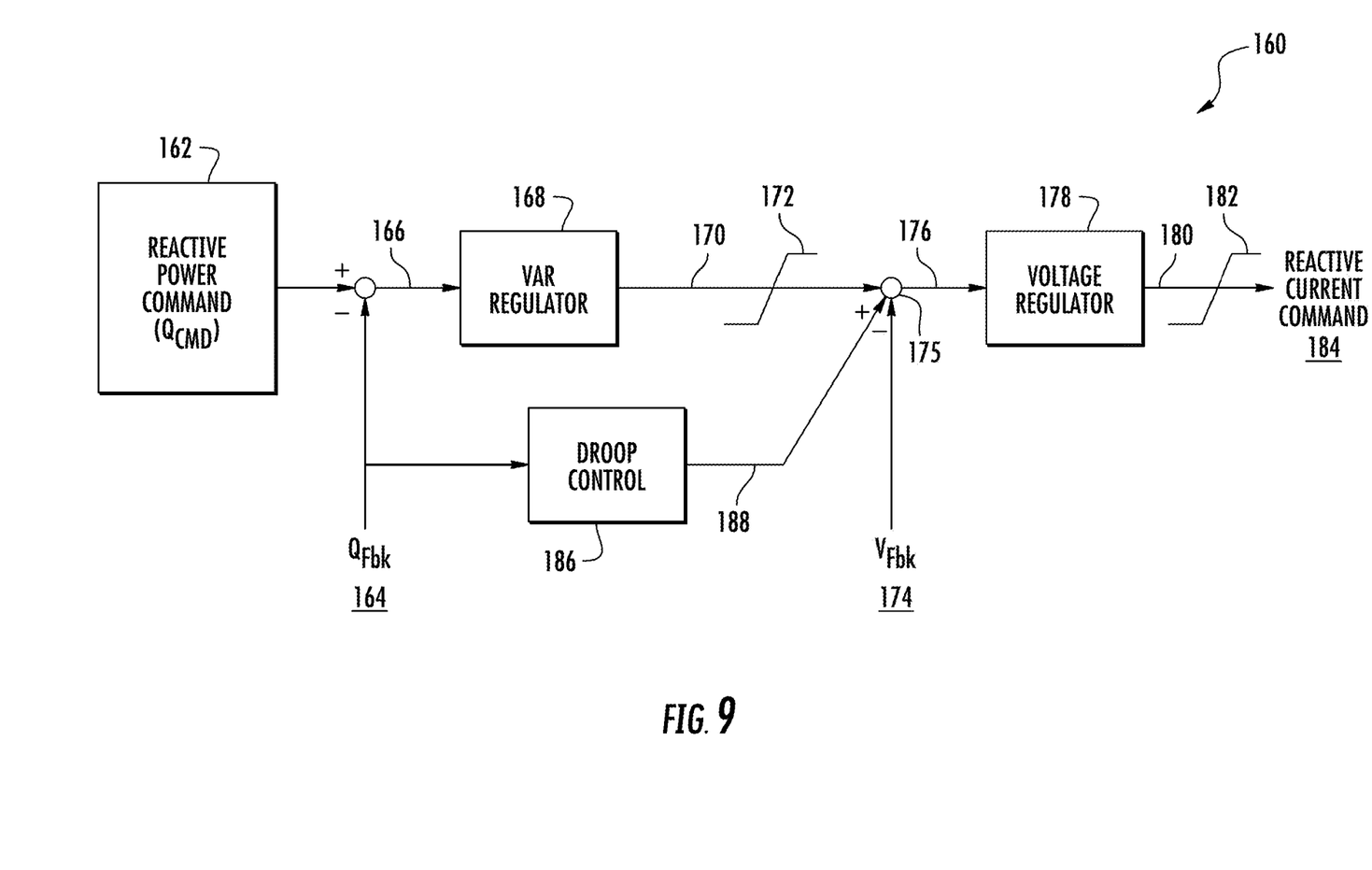
FIG. 9 illustrates a schematic diagram of one embodiment of a control system according to the present disclosure.

However, due to the absence of impedance provided by the stator winding 35 in the main three-winding transformer 34 of conventional systems, the goal of each wind turbine regulating its terminal voltage becomes difficult. More specifically, such systems (i.e. the systems illustrated in FIG. 6) have been known to experience reactive power oscillations. Thus, FIG. 9 illustrates a schematic diagram of one embodiment of a control system 160 according to the present disclosure that addresses the issues associated with the elimination of the main transformer 34 illustrated in FIG. 2.

As shown, the control system 160 includes two loops: a voltage regulator loop and a Q regulator loop. The voltage regulator loop operates relatively fast (e.g., 20 rad/sec) as compared to the Q regulator loop (e.g., greater than 1 second closed loop time constant). Further, the Q regulator 168 adjusts the set point of the voltage regulator. Conceptually, the control system of FIG. 9 provides for wind turbine generator terminal voltage control by regulating the voltage according to a reference set by a higher-than-generator-level (e.g., substation or wind farm) controller. Reactive power is regulated over a longer term (e.g., several seconds) while wind turbine generator terminal voltage is regulated over a shorter term (e.g., less than several seconds) to mitigate the effects of fast grid transients.

More specifically, as shown, the reactive power command ($Q_{CMD}$) 162, which corresponds to a command indicating the target reactive power to be produced, is compared to a signal indicating measured reactive power 164 ($Q_{Fbk}$). The resulting error signal 166 indicates the difference between the measured reactive power 164 and the commanded reactive power 162. The error signal 166 is an input signal to VAR regulator 168, which generates V command 170 that indicates to the generator 116 the reactive power to be provided by the generator 116. In one embodiment, the VAR regulator 168 may be a proportional integral (PI) controller that has a closed-loop time constant in the range of 1 to 10 seconds (e.g., 3 seconds, 5 seconds, 5.5 seconds). Other types of controllers can also be used, for example, proportional derivative (PD) controllers, proportional integral derivative (PID) controllers, state space controllers, etc. Other time constants can be used for the VAR regulator 168 provided that the time constant for the VAR regulator 168 is numerically greater than the time constant for the voltage regulator 178.

The V command 170 is limited to a predetermined range, for example, via a first limiter 172 and is then compared to a signal indicating measured terminal voltage 174 ($V_{Fbk}$) for the generator 116. Further, as shown, the difference between V command 170 and the measured terminal voltage 174 is the voltage error signal 176. The voltage error signal 176 is the input signal to voltage regulator 178.

The voltage regulator 178 then generates an output signal 180. The output signal 180 may be limited using a second limiter 182 so as to generate the reactive current command 184, which is used to control generator rotor current. In one embodiment, the voltage regulator 178 is a PI controller that has a closed-loop time constant of approximately 50 milliseconds. Other types of controllers can also be used, for example, PD controllers, PID controllers, etc. Other time constants can be used (e.g., 1 second, 20 milliseconds, 75 milliseconds, 45 milliseconds) for the voltage regulator 178 provided that the time constant for voltage regulator 178 is less than the time constant for the VAR regulator 168. In general, there are two components of the reactive current command 184, namely, the real power component and the reactive power component. For example, the reactive current command 184 generated as described with respect to FIG. 9 is the reactive component command. The real component can be generated in any manner known in the art.

In one embodiment, all of the limits discussed with respect to FIG. 9 are non-windup limits; however, in alternate embodiments, a subset of the limits can be non-windup limits. The limits have been discussed in terms of fixed parameters; however, dynamically variable parameters provided by, for example, a lookup table or a processor or state machine executing a control algorithm can provide the limits. Such a dynamically variable limit may be based upon a current rating of the generator and a contemporaneous real power output.

Still referring to FIG. 9, as shown, the control system 160 also includes a droop control 186 for generating a voltage droop signal 188. More specifically, as shown, the droop control 186 is configured with the Q regulator loop and the voltage regulator loop so as to generate a droop output signal that is used by the control system 160 as shown at 175. As used herein, the droop control 186 generally refers to a loss in output voltage from a device as it drives a load. As such, by providing a droop control with each of the turbines in the wind farm, the droop control 186 allows synchronous generators to run in parallel, so that loads are shared among generators in proportion to their power rating.

Figure 10:
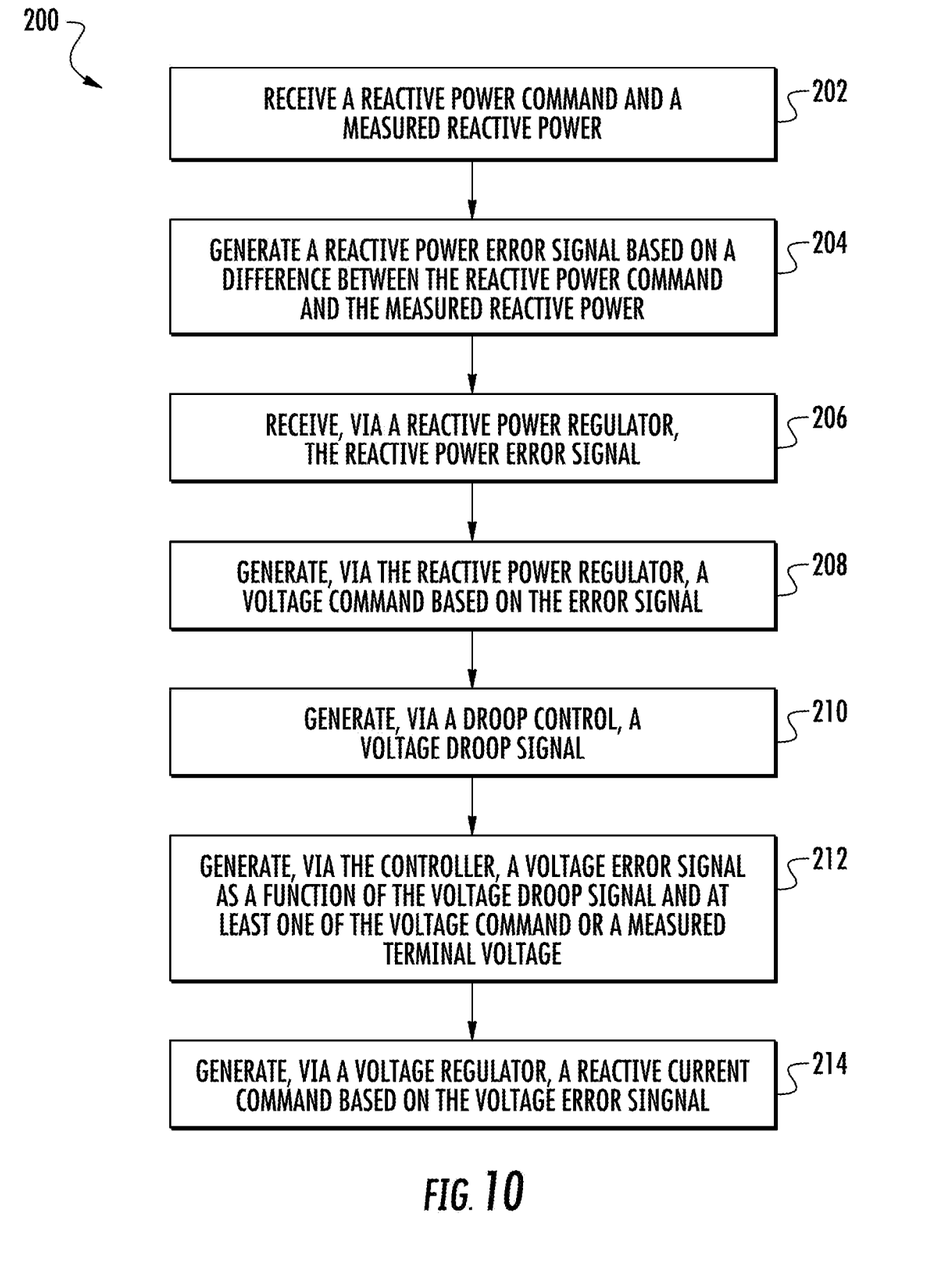
FIG. 10 illustrates a flow diagram of one embodiment of a method for controlling an electrical power system connected to a power grid according to the present disclosure.

Referring now to FIG. 10, a flow diagram of one embodiment of a method 200 controlling a wind farm (e.g. such as the wind farm 100 illustrated in FIG. 7) is illustrated according to the present disclosure. As shown at 202, the method 200 includes receiving, via the control system 160, the reactive power command 162 and the measured reactive power $Q_{Fbk}$ 164. As shown at 204, the method 200 includes generating, via the control system 160, the reactive power error signal 166 based on a difference between the reactive power command 162 and the measured reactive power $Q_{Fbk}$ 164. As shown at 206, the method 200 includes receiving, via the reactive power regulator 168, the reactive power error signal 166. As shown at 208, the method 200 includes generating, via the reactive power regulator 168, a voltage command (i.e. the V command 170) based on the reactive power error signal 166.

As shown at 210, the method 200 includes generating, via the droop control 186, the voltage droop signal 188. As shown at 212, the method 200 includes generating, via the control system 160, the voltage error signal 176 as a function of the voltage droop signal 188 and at least one of the voltage command 170 or the measured terminal voltage $V_{Fbk}$ 174. More specifically, in one embodiment, the control system 160 may generate the voltage error signal 176 using Equation (1) below. For example, as shown, the control system 160 may generate the voltage error signal 176 by subtracting the measured terminal voltage $V_{Fbk}$ 174 from the voltage command 170 ($V_{cmd}$) to obtain a first value. The control system 160 may then multiply the measured reactive power ($Q_{Fbk}$) by the voltage droop signal 188 ($K_{droop}$) to obtain a second value. The control system 160 can then subtract the second value from the first value to obtain the voltage error signal 176 as shown below.

$$\text{Voltage Error Signal} = (V_{cmd} - V_{Fbk} - Q_{Fbk} * K_{droop}) \quad \text{Equation (1)}$$

As shown at 214, the method 200 includes generating, via a voltage regulator, the reactive current command 184 based on the voltage error signal 176. More specifically, the reactive current command may be calculated using Equation (2) below.

$$\text{Reactive Current Command} = (V_{cmd} - V_{Fbk} - Q_{Fbk} * K_{droop}) G_{V(s)} \quad \text{Equation (2)}$$

Where $G_{V(s)}$ is the voltage regulator value.

More specifically, as shown in FIG. 9, the control system 160 may generate the output signal 180 based on the voltage error signal 176, limit the output signal 180 of the voltage regulator 178 via the second limiter 182, and generate the reactive current command 184 based on the limited output signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electrical power system connected to a power grid, the electrical power system having a plurality of clusters of electrical power subsystems, each of the electrical power subsystems defining a generator, a stator power path, and a converter power path for providing power to the power grid, the converter power path having a partial power transformer, the method comprising:

receiving, via a controller, a reactive power command and a measured reactive power;

generating, via the controller, a reactive power error signal based on a difference between the reactive power command and the measured reactive power;

receiving, via a reactive power regulator, the reactive power error signal;

generating, via the reactive power regulator, a voltage command based on the reactive power error signal;

generating, via a droop control, a voltage droop signal;
generating, via the controller, a voltage error signal as a function of the voltage droop signal, the voltage command, and a measured terminal voltage, wherein generating the voltage error signal as a function of the voltage droop signal, the voltage command, and the measured terminal voltage further comprises:
  subtracting the measured terminal voltage from the voltage command to obtain a first value,
  multiplying the measured reactive power by a gain to form the voltage droop signal, wherein the voltage droop signal corresponds with a second value and is configured with a reactive power regulator loop and a voltage regulator loop of the electrical power system; and
  subtracting the second value from the first value to obtain the voltage error signal; and
generating, via a voltage regulator, a reactive current command based on the voltage error signal, wherein the reactive current command is obtained by multiplying the voltage error signal by a voltage regulator value.

2. The method of claim 1, further comprising limiting the voltage command via a first limiter.

3. The method of claim 1, wherein generating the reactive current command based on the voltage error signal further comprises:
  generating an output signal based on the voltage error signal;
  limiting the output signal of the voltage regulator via a second limiter; and,
  generating the reactive current command based on the limited output signal.

4. The method of claim 1, wherein the partial power transformer comprises at least one of a two-winding transformer or a three-winding transformer.

5. The method of claim 1, wherein the reactive power regulator comprises at least one of a proportional integral (PI) controller, a proportional derivative (PD) controller, a proportional integral derivative (PID) controller, or a state space controller.

6. The method of claim 1, wherein the voltage regulator comprises at least one of a proportional integral (PI) controller, a proportional derivative (PD) controller, a proportional integral derivative (PID) controller, or a state space controller.

7. The method of claim 1, wherein the generator of each of the electrical power subsystems comprises a doubly-fed induction generator (DFIG).

8. The method of claim 1, wherein the electrical power system comprises a wind farm, and wherein the electrical power subsystems comprise wind turbine power systems.

9. A control system for an electrical power system connected to a power grid, the electrical power system having a plurality of clusters of electrical power subsystems, each of the electrical power subsystems defining a stator power path and a converter power path for providing power to the power grid, the converter power path having a partial power transformer, the control system comprising:
  one or more sensors for generating at least one of a measured reactive power or a measured terminal voltage;
  a controller configured to receive a reactive power command and the measured reactive power and generate a reactive power error signal based on a difference between the reactive power command and the measured reactive power;
  a reactive power regulator configured to receive the reactive power error signal and generate a voltage command based on the reactive power error signal;
  a droop control configured to generate a voltage droop signal;
  the controller further configured to generate a voltage error signal as a function of the voltage droop signal, the voltage command, and the measured terminal voltage, wherein the controller generates the voltage error signal as a function of the voltage droop signal, the voltage command, and the measured terminal voltage by:
    subtracting the measured terminal voltage from the voltage command to obtain a first value,
    multiplying the measured reactive power by the voltage droop signal to obtain a second value, wherein the voltage drop signal is configured with a reactive power regulator loop and a voltage regulator loop of the electrical power system, and
    subtracting the second value from the first value to obtain the voltage error signal; and,
  a voltage regulator configured to generate a reactive current command based on the voltage error signal, wherein the reactive current command is obtained by multiplying the voltage error signal by a voltage regulator value.

10. The control system of claim 9, further comprising a first limiter configured to limit the voltage command.

11. The control system of claim 9, wherein the voltage regulator generates the reactive current command based on the voltage error signal by:
  generating an output signal based on the voltage error signal;
  limiting the output signal of the voltage regulator via a second limiter; and,
  generating the reactive current command based on the limited output signal.

12. The control system of claim 9, wherein the partial power transformer comprises at least one of a two-winding transformer or a three-winding transformer.

13. The control system of claim 9, wherein the reactive power regulator comprises at least one of a proportional integral (PI) controller, a proportional derivative (PD) controller, a proportional integral derivative (PID) controller, or a state space controller.

14. The control system of claim 9, wherein the voltage regulator comprises at least one of a proportional integral (PI) controller, a proportional derivative (PD) controller, a proportional integral derivative (PID) controller, or a state space controller.

15. The control system of claim 9, wherein the generator of each of the electrical power subsystems comprises a doubly-fed induction generator (DFIG).

16. The control system of claim 9, wherein the electrical power system comprises a wind farm, and wherein the electrical power subsystems comprise wind turbine power systems.

17. A wind farm, comprising:
  a plurality of wind turbine clusters each comprising a plurality of wind turbines, each of the wind turbines having a power converter electrically coupled to a generator with a generator rotor and a generator stator, each of the wind turbines defining a stator power path and a converter power path for providing power to the power grid, the converter power path containing a partial power transformer;

a cluster transformer connecting each cluster of wind turbines to a power grid; and, a plurality of turbine controllers, each of the turbine controllers communicatively coupled to one of the wind turbines, the turbine controllers configured to perform one or more operations, the one or more operations comprising:

receiving a reactive power command and a measured reactive power;

generating a reactive power error signal based on a difference between the reactive power command and the measured reactive power;

receiving the reactive power error signal;

generating a voltage command based on the reactive power error signal;

generating a voltage droop signal;

generating, via the controller, a voltage error signal as a function of the voltage droop signal, the voltage command, and a measured terminal voltage, wherein generating the voltage error signal as a function of the voltage droop signal, the voltage command, and the measured terminal voltage further comprises:

subtracting the measured terminal voltage from the voltage command to obtain a first value, multiplying the measured reactive power by a gain to form the voltage droop signal, wherein the voltage droop signal corresponds with a second value and is configured with a reactive power regulator loop and a voltage regulator loop of the electrical power system; and subtracting the second value from the first value to obtain the voltage error signal; and generating a reactive current command based on the voltage error signal, wherein the reactive current command is obtained by multiplying the voltage error signal by a voltage regulator value.

* * * * *